Aug. 1, 1950 L. WAINWRIGHT 2,516,932
PNEUMATIC METER OR THE LIKE
Filed April 25, 1947 2 Sheets-Sheet 1
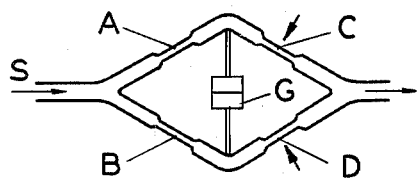
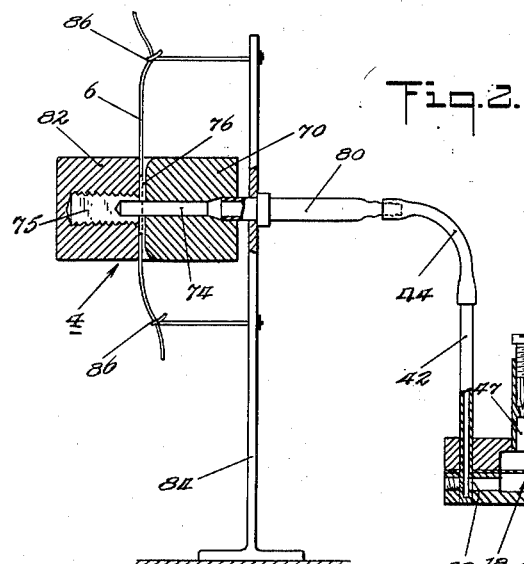
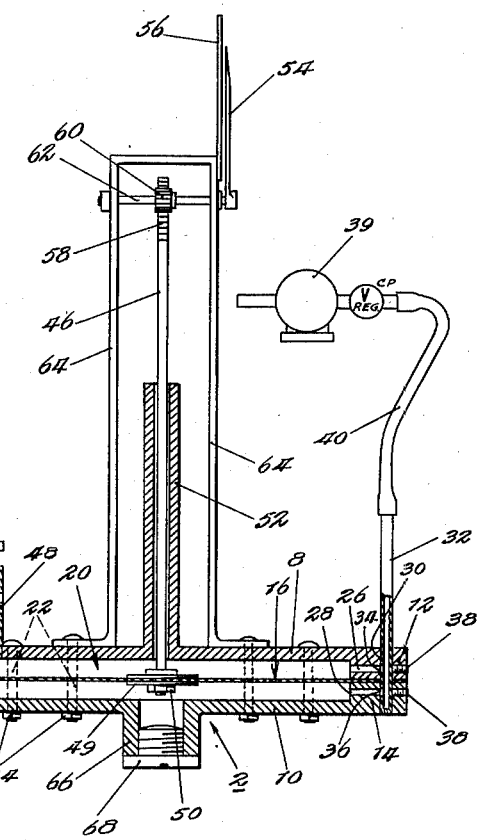
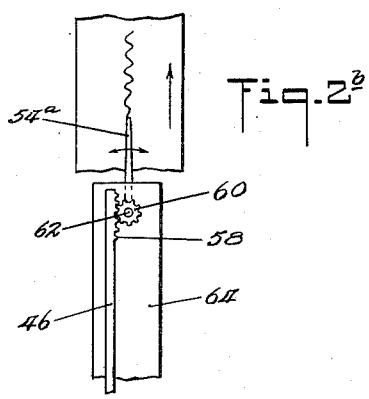
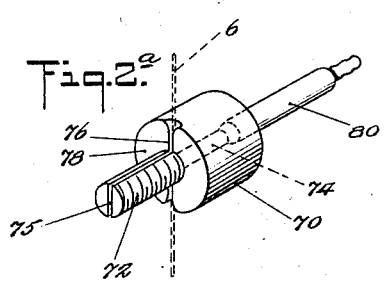
INVENTOR.
LAWRENCE WAINWRIGHT
BY *[signature]*
ATTORNEY Aug. 1, 1950 L. WAINWRIGHT 2,516,932
PNEUMATIC METER OR THE LIKE
Filed April 25, 1947 2 Sheets-Sheet 2
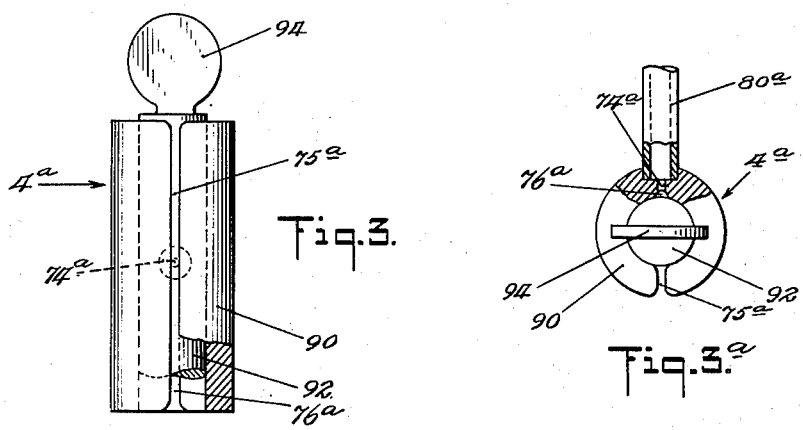
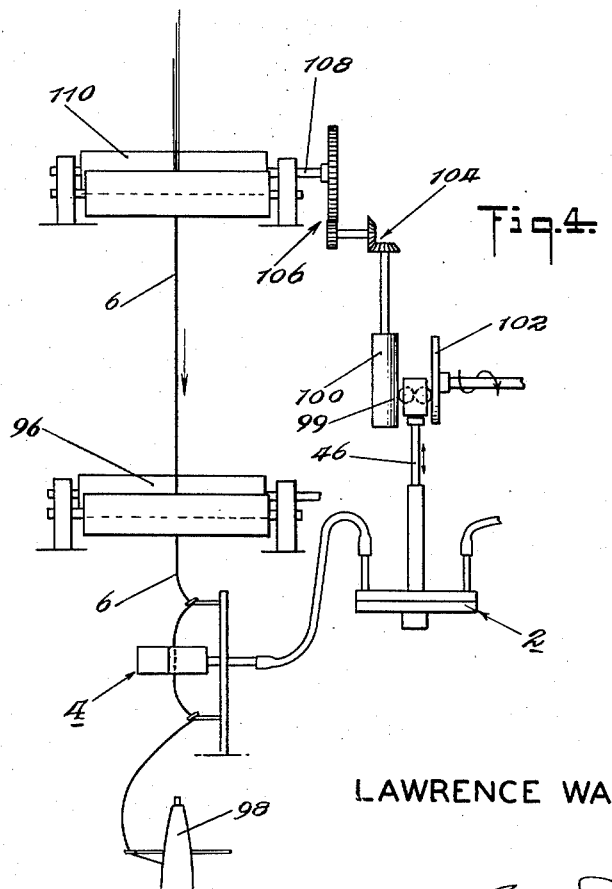
INVENTOR.
LAWRENCE WAINWRIGHT Patented Aug. 1, 1950

2,516,932

UNITED STATES PATENT OFFICE 2,516,932

PNEUMATIC METER OR THE LIKE

Lawrence Wainwright, Brooklyn, N. Y., assignor to Deering Milliken Research Trust, New York, N. Y., a nonprofit trust of New York Application April 25, 1947, Serial No. 743,816

4 Claims. (Cl. 73—37.5)

The present invention relates to measuring devices and particularly to devices for measuring the diameter or cross-section of filamentary material such as yarn, wire or the like, and comprises a simple, rugged and accurate pneumatically operated device of this character which is relatively quick acting and of compact construction.

The device of the invention is particularly adapted for the continuous measurement of filament cross-section variations during travel of the filament and may be arranged for recording such variations or for regulation of filament cross-section by control of an element affecting the production of the filament.

There has been a substantial need, particularly in the textile industry, for a filament cross-section or diameter meter or regulator that would be both accurate and quick acting and also relatively economical to manufacture and operate. Photo-electric metering devices have recently been suggested because of their quick response and because of the fact that control signals obtained thereby can be conveniently amplified for operation of recording or regulating devices.

Photo-electric measuring devices, however, not only involve considerable relatively costly and sensitive equipment, but are subject to inaccuracy when used to measure the diameter of filaments of non-circular cross-sections, as for example, yarn of low twist factor.

Pneumatic devices, on the other hand, are not subject to inaccuracies due to non-circular cross-section of filament, but constructions heretofore proposed have been sluggish in operation and unwieldly in size.

The device of the present invention, being small, quick acting, powerful and accurate, thus combines the advantages of the photoelectric and earlier pneumatic types of meters while omitting the disadvantages thereof.

For an understanding of the new meter or regulator, reference may be had to the accompanying drawings of which:

Fig. 1 is a schematic diagram illustrating the principle of the pneumatic meter of the invention;

Fig. 2 is a view partly in section of the meter assembly, comprising the differential pressure unit and jet tube;

Fig. 2a is a perspective view of the jet tube of Fig. 2 with the closure member thereof removed;

Fig. 2b is a fragmentary view illustrating a modification;

Figs. 3 and 3a are front and top plan views, respectively, of a different form of jet tube for use in the assembly of Fig. 1, and Fig. 4 is a diagram showing the meter of Fig. 1 connected for regulation of a yarn spinning mechanism.

The principle of operation of the new meter may be readily understood by reference to the diagram of Fig. 1 which is in the form of the well known Wheatstone bridge network, but comprises pneumatic, rather than electrical elements. In Fig. 1, A, B, C and D represent flow impedances, as, for example, restricted passages, and G represents a pressure gauge for measuring the pressure differential across the bridge. Air under constant pressure is supplied to the network at S and exhausted to atmosphere through C and D. In the device of the invention, a restriction which varies with the dimensions of the filament being measured corresponds with the restriction C and an adjustable orifice corresponds with the restriction D. Thus, D may be adjusted to balance the network for any predetermined dimensions of the filament and variations of such filament dimensions will be indicated by the gauge G. Alternatively, the bridge could be balanced before introduction of the filament into the restriction corresponding to C and magnitude of filament dimensions indicated by G.

Fig. 1, of course, is purely diagrammatic. It does not represent any practical construction of meter.

In Fig. 2, a meter assembly, operating on the principle of Fig. 1, is illustrated. The assembly of Fig. 2 comprises in general a pressure responsive unit indicated at 2 and a jet tube 4 for passage of filamentary material 6 therethrough. The pressure responsive unit 2 comprises upper and lower discs 8 and 10 provided with mating annular flanges 12 and 14, respectively. A diaphragm 16 which is circumferentially held between the flanges 12 and 14, divides the interior of unit 2 into two chambers 18 and 20. The parts of the unit are held together by means of bolts 22 which pass through aligned passages in the flanges and diaphragm and have nuts 24 threaded on their ends. A pair of radial passages 26 and 28 are drilled in the flanges 12 and 14, respectively, so as to intersect at right angles a passage 30 which extends through the flanges and which is adapted to receive a tubular member 32. Member 32 is closed at one end and is provided with a pair of small orifices 34 and 36 which are aligned with passages 26 and 28, respectively. Passages 26 and 28 outward from their junction with passage 30 are threaded for reception of set screws 38 which press the tube 32 firmly against the inner wall of passage 30 and prevent leakage. Tube 32 is connected by flexible tubing 40 to a suitable source of constant air pressure, indicated diagrammatically as a pump 39, delivering pressure through a suitable regulating valve. The orifices 34 and 36 correspond with the impedances A and B of Fig. 1, and the diaphragm 16 which is subject to the opposing pressures in chambers 18 and 20 corresponds to the element G of Fig. 1. Air escapes from chamber 18 through a tubular member 42, flexible tubing 44 and the jet tube 4, hereinafter more fully described, and escapes from chamber 20 through a tubular member 47 under control of an adjustable needle valve 48. Tubular member 42 is mounted and constructed like member 32 except that it has no orifice in communication with chamber 20 and the opening 43 thereof communicating with chamber 18 is large enough to permit substantially unrestricted flow therethrough. Jet tube 4 corresponds with impedance C of Fig. 1, and the outlet in tube 47 controlled by the needle valve 48 corresponds with the adjustable impedance D of Fig. 1.

One end of a rod 46 is secured to diaphragm 16 at the center thereof, as by means of washers 49 and nut 50. The rod 46 extends through a central aperture in disc 8 and through the bore of a tube 52 secured to the disc; the bore of the tube 52 being only slightly greater than the diameter of the rod 46 to prevent excessive leakage of air. An airtight fit is not necessary as leakage along the rod is in parallel with the leakage controlled by the needle valve 48 and hence may be considered as part of impedance D of Fig. 1. Rod 46 may be connected for operation of an indicating device, or of a recorder or of a regulator, as desired. In the particular embodiment of the invention illustrated in Fig. 1, movement of the rod in response to changes in the pressure differential acting on the diaphragm 16 moves an indicating needle 54 over a scale 56. For this purpose, the outer end of rod 46 carries a rack 58 which meshes with a gear 60 mounted on a shaft 62. Shaft 62 is rotatably supported in upright members 64 carried by disc 8. The scale 56 is conveniently mounted on one of the upright members 64 and the needle 54 is secured to shaft 62 for oscillation thereby. To allow clearance for the nut 50 during movement of the diaphragm and to provide access for orientation of the rod 46, disc 10 is centrally apertured to receive a short internally threaded tubular member 66, the outer end of which is closed by a screw plug 68.

The particular form of jet tube 4 illustrated in Figs. 2 and 2a comprises a cylindrical member 70 which has integrally secured thereto an externally threaded member 72 of lesser diameter. Member 70 is provided with an axial passage 74 terminating within the member 72. Member 72 has a diametral slot 75 therein for reception of the filament to be measured, and a groove 76 intersecting passage 74 and aligned with slot 75 is formed in the end wall 78 of member 70. Passage 74 is expanded at its outer end for reception of a tubular member 80. A removable cover or cap 82 for the threaded member 72 completes the jet tube 4. The tube is mounted on any suitable bracket 84 with the member 80 connected to the flexible tubing 44. Preferably, when the filamentary material to be measured is flexible, as for example, when yarn is to be measured, guide means 86 are mounted on the bracket 84 in a position to lead the material relatively promptly out of the path of the air issuing from the passage formed between cap 82 and member 70 by the groove 76.

In Fig. 2, the filamentary material 6, is shown in position within the jet tube 4. It will be understood that no threading of the material through the tube is necessary as it can be inserted through slot 75 and into groove 76 with cap 82 removed. When the cap 82 is in place the inner face thereof forms, with groove 76, the passage for the filament. This passage is the exit impedance for the air entering through tube 80. Preferably, as shown best in Fig. 2a, groove 76 is gradually flared at its ends to avoid turbulence of the air at exit.

In operation of the meter assembly of Fig. 2, valve 48 is initially adjusted to bring the pointer 54 in alignment with a desired reading, for example, a zero reading when initial adjustment is made without the filament in the jet tube, or to a specific reading when a filament of known cross-section is within the tube. The face of scale 56 has not been shown in the drawings as the particular calibration thereof is immaterial to the invention. It may be calibrated in terms of volume, or in terms of cross-section, or in terms of diameter as desired.

The construction of the pressure unit of Fig. 2 lends itself readily for use as a recording device. For such purpose, needle 54 could be turned outwardly at its end and provided with a stylus or pen adjacent which a chart could be moved in timed relation with the movement of yarn through the jet tube 4, as diagrammatically indicated at 54a in Fig. 2b.

Figs. 3 and 3a illustrate another form of jet tube suitable for use in the assembly of Fig. 2. In this embodiment of the invention, the tube 4a comprises an outer tubular member 90 and a removable solid core member 92, preferably ground, for a close fit in the bore of member 90. Member 90 has a longitudinal slot 75a therein and a groove 76a in its inner wall diametrically opposite the slot 75a. A radial passage 74a in member 90 intersects the groove 76a partway the length of the groove, and a tube 80a is secured to the member 90 for supply of air to the passage 74a. Core 92 may be provided with suitable gripping means as indicated at 94 for removal and insertion of the core. Yarn or other filamentary material is inserted through slot 75a and positioned in groove 76a before insertion of the core 92. The ends of groove 76a, like those of groove 76 of jet tube 4, are preferably slightly flared, as indicated in Fig. 3.

The relation between the size of filament passage in the jet tubes and size of filamentary material is not critical but preferably for high sensitivity, the cross-section of the passage should be not much over twice the average cross-section of the filament. Thus a single jet tube can be used for measuring a fairly wide range of filamentary material or one having large variations along its length. Ordinarily, when coarse yarns, for example, are to be measured, a jet tube with larger passage would be employed than when fine yarns are measured. With change in dimensions of the filament passage of the jet tube, no change, except adjustment of the needle valve 48, is required in the differential pressure unit.

In a co-pending application of Donald G. C. Hare, Ser. No. 735,457, filed March 18, 1947, control of yarn cross-section or diameter during production of the yarn is disclosed and claimed. The method disclosed in that application involved the continuous measurement of yarn diameter or cross-section to produce a control signal operative to regulate an element affecting the production of the yarn, and as a specific example, the produced control signal was used to regulate the rate of feed of the feed rolls of a yarn spinning mechanism. In Fig. 4, the pneumatic device of Fig. 2 is arranged for control of the rate of rotation of the feed rolls of a spinning mechanism in accordance with the disclosure of the said Hare application. In Fig. 4, the jet tube 4 is positioned for passage of the yarn 6 therethrough in its travel from the draft rolls 96 to the ring spinner 98 of a conventional spinning mechanism. The rod 46 of unit 2 is connected to the movable element 99 of a conventional planetary transmission mechanism comprising the driven cylinder 100 and driving disc 102 so as to vary the rate of rotation of the cylinder 100 in response to variations in the cross-section of the yarn 6. Cylinder 100, through suitable gearing indicated diagrammatically as comprising bevel gears 104 and spur gears 106, drives the shaft 108 of feed roll 110. With this arrangement, when the diameter or cross-section of the yarn increases above a desired value, rod 46 moves element 99 toward the center of driving disc 102, thus reducing the rate of rotation of cylinder 100 and consequently that of the feed roll 110. The increase in draft ratio occasioned by such reduction in the rate of rotation of the feed rolls, results in reduction of the size of yarn being drafted. Conversely, a decrease in yarn cross-section causes movement of rod 46 in the reverse direction with consequent increase in rate of rotation of the feed rolls, reduction of draft ratio and increase in yarn size.

The invention has now been described with reference to its use as a meter, a recorder and as a regulator for the driven feed roll of a yarn spinning mechanism. Other uses for the device as a regulator will readily occur to those skilled in the art.

From the foregoing description it will be apparent that the pneumatic device of the invention is simple of construction, requires a minimum of adjustment and is relatively compact. The parts, thereof, namely, the jet tube and the pressure unit may be made of relatively small size. For example, a suitable jet tube for yarn may be under two inches in length (measured along the length of the yarn) and less than two inches across; the outer diameter of the pressure unit may be under three inches and the depth about one-half inch. With a supply pressure of ten pounds per square inch, orifices 34 and 36 of .028 inch in diameter and the area of the diaphragm four square inches, a force equal to five pounds can be developed on the diaphragm for metering or regulating purposes. With sufficient tension on the diaphragm, quick response to yarn cross-section variations is obtained.

Obviously various changes could be made in the particular constructions illustrated without departing from the spirit of the invention. For example when relatively large displacement of the pressure sensitive element is desired, a piston could be substituted for the diaphragm 16.

The following is claimed:

1. A pneumatic gauge for filamentary material comprising in combination, an enclosure, a pressure responsive element in said enclosure dividing the same into two chambers, means for admitting a restricted flow of air under pressure into each of said chambers, a tubular device having a restricted outlet passage connected to one of said chambers for escape of air therefrom, said passage being adapted for reception of filamentary material, valve means controlling escape of air from the other chamber and a member extending from said casing and secured to said element for movement therewith, whereby when said valve means is adjusted for equalization of pressures in said chambers with a filamentary material of one size in the passage of said tubular device, a change in size of the material will cause movement of said member.

2. A pneumatic gauge for filamentary material comprising in combination a tubular member having an elongated passage for reception and travel therethrough of filamentary material and having a passage intersecting said first passage for delivery of air thereto, a pressure sensitive unit comprising a casing, pressure responsive element within said casing dividing the interior thereof into two chambers, a rod extending through said casing and connected with said element for movement therewith, means for admitting restricted flow of air under pressure to both of said chambers, and means for delivering air from one of said chambers to said last mentioned passage of said tubular member.

3. The combination according to claim 2 wherein said tubular member comprises two separable parts having engaging wall portions, one of said wall portions having a groove therein which together with the adjacent wall portion of the other part forms the first mentioned passage, whereby the filamentary material may be inserted in said groove while the parts are separated.

4. The combination according to claim 3 wherein said groove flares outwardly at the ends thereof to minimize turbulence of the emitted air.

LAWRENCE WAINWRIGHT.

REFERENCES CITED

The following references are of record in the file of this patent:

UNITED STATES PATENTS

| Number | Name | Date |
|---|---|---|
| 887,280 | Smith | May 12, 1908 |
| 1,007,280 | Goblet | Oct. 31, 1911 |
| 2,077,525 | Mennesson | Apr. 20, 1937 |
| 2,205,304 | Mutter | June 18, 1940 |
| 2,266,566 | Poole | Dec. 16, 1941 |
| 2,350,058 | May | May 30, 1944 |
| 2,402,293 | Nye | June 18, 1946 |
| 2,407,100 | Richardson | Sept. 3, 1946 |